United States Patent
Sha

(10) Patent No.: US 11,830,521 B2
(45) Date of Patent: Nov. 28, 2023

(54) VOICE ACTIVITY DETECTION METHOD AND SYSTEM BASED ON JOINT DEEP NEURAL NETWORK

(71) Applicant: Zhuhai Eeasy Technology Co., Ltd., Guangdong (CN)

(72) Inventor: Lulu Sha, Guangdong (CN)

(73) Assignee: Eeasy Technology Co., Ltd., Guangdong (CN)

( * ) Notice: Subject to any disclaimer, the term of this patent is extended or adjusted under 35 U.S.C. 154(b) by 279 days.

(21) Appl. No.: 17/471,197

(22) Filed: Sep. 10, 2021

(65) Prior Publication Data
US 2022/0180894 A1    Jun. 9, 2022

(30) Foreign Application Priority Data

Dec. 4, 2020  (CN) .......................... 202011397477.X

(51) Int. Cl.
| | |
|---|---|
| *G10L 25/78* | (2013.01) |
| *G06N 3/08* | (2023.01) |
| *G10L 21/00* | (2013.01) |
| *G10L 25/18* | (2013.01) |
| *G06N 3/045* | (2023.01) |

(52) U.S. Cl.
CPC .............. *G10L 25/78* (2013.01); *G06N 3/045* (2023.01); *G06N 3/08* (2013.01); *G10L 21/00* (2013.01); *G10L 25/18* (2013.01); *G10L 2025/783* (2013.01)

(58) Field of Classification Search
CPC ......... G10L 25/78; G10L 21/00; G10L 25/18; G10L 2025/783; G10L 25/30; G10L 25/87; G10L 25/24; G06N 3/045; G06N 3/08; G06N 3/044
See application file for complete search history.

(56) References Cited

U.S. PATENT DOCUMENTS

| | | | | |
|---|---|---|---|---|
| 9,502,038 | B2* | 11/2016 | Wang | ..................... G10L 17/04 |
| 10,482,873 | B2* | 11/2019 | Heigold | .................. G10L 15/16 |
| 2017/0011738 | A1* | 1/2017 | Senior | ................... G10L 15/063 |
| 2019/0392859 | A1* | 12/2019 | Li | ........................... G10L 25/84 |
| 2022/0254352 | A1* | 8/2022 | Fujita | ..................... G06N 3/045 |

OTHER PUBLICATIONS

Dinkel et al, Voice Activity Detection in the Wild: A Data-Driven Approach Using Teacher-Student Training, 2021, IEEE/ACM Transactions on Audio, Speech, and Language Processing, vol. 29 (Year: 2021).*

* cited by examiner

*Primary Examiner* — Linda Wong
(74) *Attorney, Agent, or Firm* — Gang Yu

(57) ABSTRACT

The present disclosure discloses a VAD method and system based on a joint DNN. The method includes: acquiring original audio data and a first frame-level label based on an open-source audio data set, adding noise on the original audio data to obtain first audio data, recording an environment sound to obtain second audio data, and performing clip-level label on the second audio data to obtain a clip-level label; inputting the first audio data, the second audio data and the corresponding labels into a first neural network to obtain a first-stage network model; obtaining a second frame-level label through the first-stage network model, and inputting the second audio data and the second frame-level label into a second neural network to obtain a second-stage network model; and performing VAD on an audio signal based on the first-stage network model and the second-stage network model.

17 Claims, 2 Drawing Sheets

VOICE ACTIVITY DETECTION METHOD AND SYSTEM BASED ON JOINT DEEP NEURAL NETWORK

CROSS-REFERENCE TO RELATED APPLICATION

The present disclosure is based on and claims priority to Chinese Patent Application No. 202011397477.X, filed on Dec. 4, 2020, the entire contents of which are incorporated herein by reference.

TECHNICAL FIELD

The present disclosure relates to the technical field of audio processing, and in particular to a Voice Activity Detection (VAD) method and system based on a joint Deep Neural Network (DNN).

BACKGROUND

VAD refers to a detection of a start point and an end point of an actual voice segment from a continuous audio signal to detect voiced speech segments and distinguish those from unvoiced ones. The VAD can provide voiced data for a subsequent voice processing system and discard unvoiced data signals, thereby reducing the computation of the subsequent voice processing system, and contributing to increasing the response speed of the system.

VAD algorithms may be divided into two categories: a traditional VAD algorithm and a DNN-based VAD algorithm. The traditional algorithm is relatively simple in computation, but has a low accuracy in the real environment, especially in a low SNR environment. While the DNN-based VAD algorithm is large in computation, and depends on labeled data, the labeled data needing to be matched is used as a training data set. Sound scene and background noise contained in a real environment are various and complex, and manual labeling is costly. In order to achieve ideal results, the network structure is complex and large in computation.

SUMMARY

At least some embodiments of the present disclosure provide a VAD method based on a joint DNN to at least partially solve one of the technical problems in the related art.

In an embodiment of the present disclosure, a VAD method based on a joint DNN is provided, which includes the following steps: S100, original audio data and a first frame-level label are acquired based on an open-source audio data set, noise is added on the original audio data to obtain first audio data, an environment sound is recorded to obtain second audio data, and clip-level label is performed on the second audio data to obtain a clip-level label; S200, the first audio data and the first frame-level label as first training data and the second audio data and the clip-level label as second training data are input into a first neural network for training to obtain a first-stage network model; S300, a second frame-level label corresponding to the second audio data is obtained through the first-stage network model, and the second audio data and the second frame-level label are input into a second neural network for training to obtain a second-stage network model; and S400, VAD is performed on an audio signal based on the first-stage network model and the second-stage network model.

The VAD method based on a joint DNN according to the embodiments of the present disclosure has at least the following beneficial effects: weak label (i.e. clip-level label) data is made in an environment through an open-source data set, the labeled data is replaced, labor consumption in the early stage is reduced, the environment is recorded and clip-level label is performed, so that the defect of poor VAD effect caused by lack of actual labeled data and application scene mismatch is overcome; through two-stage network structure joint training, frame data under an environment is generated in the first stage, therefore, retraining using a smaller network may be performed in the second stage, the computation in the actual process is greatly reduced, the inference process is accelerated, and both the performance and the operation speed are considered; moreover, the frame-level label data of the synthesized audio and the weak label data of the real sound scene are fully utilized for joint training, so that the network can obtain more accurate frame-level labels.

In some embodiments of the present disclosure, step S100 includes: S110, the original audio data is acquired based on the open-source audio data set, windowed framing is performed on the original audio data, and the original audio data is labeled frame by frame according to a preset energy threshold to obtain the first frame-level label, and noise is added on the original audio data in proportion to obtain the first audio data; and S120, the second audio data is clipped according to a fixed duration, it is determined whether human voice information exists in each clip-level to obtain a determination result, and the clip-level label is obtained according to the determination result.

In some embodiments of the present disclosure, step S200 includes: S210, windowed framing is performed on the first audio data and the second audio data according to a preset frame length and a preset frame spacing, M-order MEL spectrum coefficients of each frame are extracted as features of a current frame, and feature values of N frames are selected, and the M-order MEL spectrum coefficients of the feature values of N frames are inputted to the first-stage network model; and S220, it is determined that the first-stage network model includes a Convolutional Neural Network (CNN) for extracting features, a Gate Recurrent Unit (GRU) for feature prediction and a DNN for final classification output, where the DNN is used for respectively classifying the first audio data and the second audio data to obtain classification data corresponding to the first audio data and classification data corresponding to the second audio data, and a loss function in the first-stage network model is a weighted two-classification cross entropy function with weighting coefficients [w1, w2], w1 represents a weight occupied by the classification data obtained according to the first audio data, and w2 represents a weight occupied by the classification data obtained according to the second audio data.

In some embodiments of the present disclosure, the method further includes: when the second-stage network model converges relative to a second test set, a loss function of the second-stage network model is fed back to the first-stage network model for continuous training; and when the first-stage network model converges to a first test set after continuous training, it continues to iteratively train the second-stage network model until the first-stage network model converges relative to the first test set and the second stage network model converges relative to the second test set.

In some embodiments of the present disclosure, the method further includes: multiple second audio data are selected, frame-level label is performed on the multiple second audio data to obtain a third audio data set; and the third audio data set is split into two groups of data sets, one group of data sets being used for verifying and testing the first-stage network model, and the other group of data sets being used for verifying and testing the second-stage network model.

In some embodiments of the present disclosure, the number of convolutional block stacks in a CNN of the second-stage network model is less than the number of convolutional block stacks in a CNN of the first-stage network model.

In some embodiments of the present disclosure, the second-stage network model includes a CNN for feature extraction, a GRU for feature prediction, and a DNN for final classification output, a linear function and a softmax function being adopted in a DNN layer, and a loss function being a two-classification cross entropy function.

In another embodiment of the present disclosure, a VAD system based on a joint DNN is also provided, which includes: a data collection processing module, configured to acquire original audio data and a first frame-level label configured based on an open-source audio data set, add noise on the original audio data to obtain first audio data, record an environment sound to obtain second audio data, and perform clip-level label on the second audio data to obtain a clip-level label; a network joint training module, configured to input the first audio data and the first frame-level label as first training data and the second audio data and the clip-level label as second training data into a first neural network for training to obtain a first-stage network model, obtain a second frame-level label corresponding to the second audio data through the first-stage network model, and input the second audio data and the second frame-level label into a second neural network for training to obtain a second-stage network model; and a VAD module, configured to perform VAD on an audio signal based on the first-stage network model and the second-stage network model.

The VAD system based on a joint DNN according to the embodiments of the present disclosure has at least the following beneficial effects: weak label (i.e. clip-level label) data is made by recording an environment through an open-source data set, the labeled data is replaced, labor consumption in the early stage is reduced, the environment is recorded and clip-level label is performed, so that the defect of poor VAD effect caused by lack of actual labeled data and application scene mismatch is overcome; through two-stage network structure joint training, frame data under an environment is generated in the first stage, therefore, retraining using a smaller network may be performed in the second stage, the computation in the actual process is greatly reduced, the inference process is accelerated, and both the performance and the operation speed are considered; moreover, the frame-level label data of the synthesized audio and the weak label data of the real sound scene are fully utilized for joint training, so that the network can obtain more accurate frame-level labels.

In some embodiments of the present disclosure, the system further includes: a network model verification module, configured to select multiple second audio data, perform frame-level label on the multiple second audio data to obtain a third audio data set, and split the third audio data set into two groups of data sets, one group of data sets being used for verifying and testing the first-stage network model, and the other group of data sets being used for verifying and testing the second-stage network model.

In another embodiment of the present disclosure, a computer non-transitory storage medium is also provided, which stores a computer program, which is executed by a processor to implement the above VAD method based on the joint DNN.

The computer non-transitory storage medium according to the embodiments of the present disclosure has at least the same beneficial effects as the above VAD method based on a joint DNN.

Additional aspects and advantages of the present disclosure will be set forth in part in the following description. Some will become apparent from the following description, or will be understood by the practice of the present disclosure.

BRIEF DESCRIPTION OF THE DRAWINGS

The above and/or additional aspects and advantages of the present disclosure will become apparent and readily understood from the description of the embodiments in conjunction with the accompanying drawings, in which.

DESCRIPTION OF THE REFERENCE SIGNS

Figure 1:
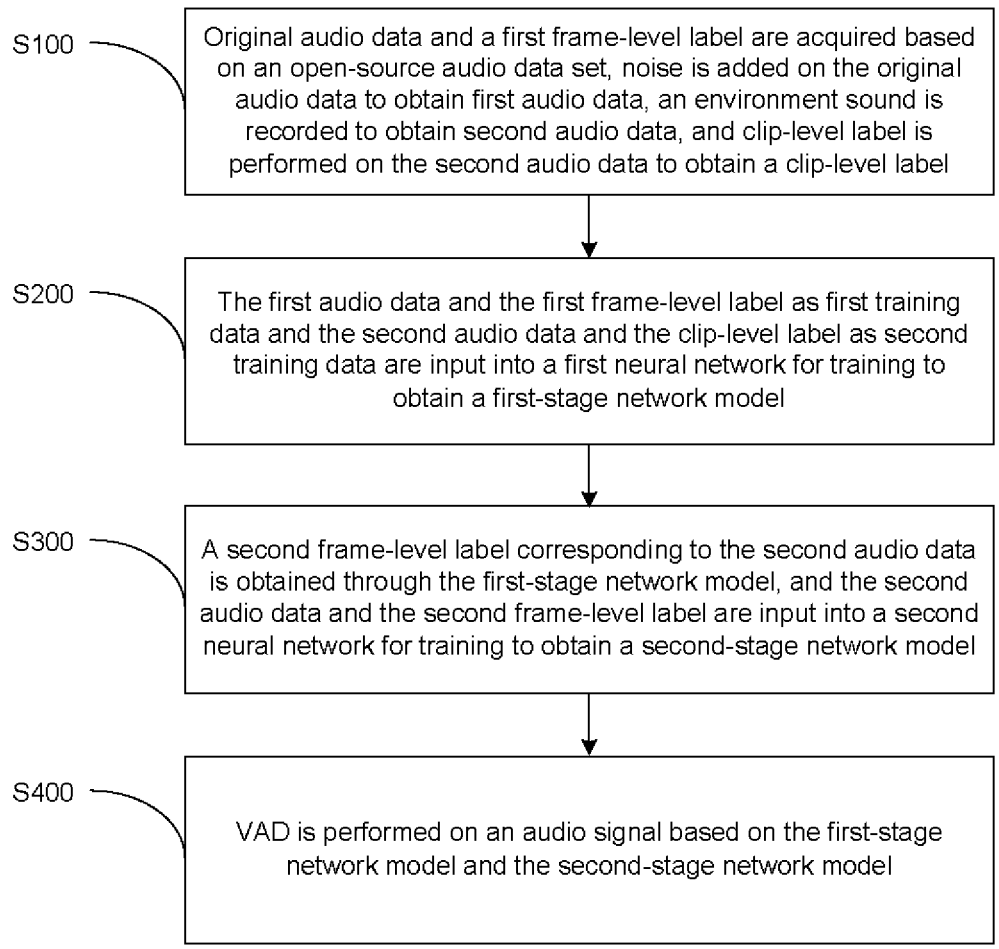
FIG. 1 is a schematic flowchart of a method according to an embodiment of the present disclosure.

100, Data collection processing module; 200, network joint training module; 300, VAD module; 400, network model verification module.

DETAILED DESCRIPTION

The embodiments of the present disclosure are described in detail below, and the examples of the embodiments are illustrated in the drawings, where the same or similar reference numerals are used for referring to the same or similar elements or elements having the same or similar functions. The embodiments described below with reference to the drawings are intended to be illustrative of the present disclosure and are not to be construed as limiting the present disclosure.

In the description of the present disclosure, several means at least one, multiple means at least two, more than, less than, exceeding, etc. are understood not to include the present number, and the above, below, within, etc. are understood to include the present number. When the first and second are described for the purpose of distinguishing technical features, it is not to be understood as indicating or implying relative importance or implicitly indicating the number of the indicated technical features or implicitly indicating the precedence relationship of the indicated technical features.

Term Interpretation:

Convolutional Neural Network (CNN) is a Feedforward Neural Network (FENN) which contains convolutional computation and has a depth structure and is one of the representative algorithms of deep learning.

Gate Recurrent Unit (GRU) is a Recurrent Neural Network (RNN).

Deep Neural Network (DNN) is the basis of depth learning.

Flatten layer is used to "flatten" the input, i.e., to make the input in multiple dimensions unidimensional, often used for transition from a convolution layer to a fully connected layer.

As shown in FIG. 1, the method according to the embodiment of the present disclosure includes the following steps.

At step S100, original audio data and a first frame-level label are acquired based on an open-source audio data set, noise is added on the original audio data to obtain first audio data, an environment sound is recorded to obtain second audio data, and clip-level label is performed on the second audio data to obtain a clip-level label.

At step S200, the first audio data and the first frame-level label as first training data and the second audio data and the clip-level label as second training data are input into a first neural network for training to obtain a first-stage network model.

At step S300, a second frame-level label corresponding to the second audio data is obtained through the first-stage network model, and the second audio data and the second frame-level label are input into a second neural network for training to obtain a second-stage network model.

At step S400, VAD is performed on an audio signal based on the first-stage network model and the second-stage network model.

Figure 2:
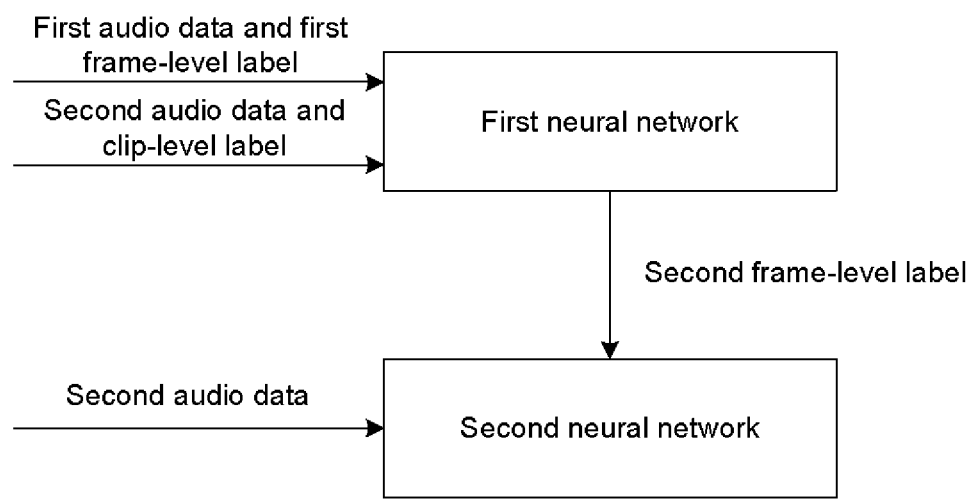
FIG. 2 is a schematic diagram of data interaction for training a neural network in a method according to an embodiment of the present disclosure.

In some embodiments of the present disclosure, the training process of the neural network, as shown in FIG. 2, includes the following steps.

Firstly, the first audio data and the first frame-level label, which are set as first training data, and the second audio data and the clip-level label, which are set as second training data, are input into the first neural network for training, so that the first neural network converges relative to a first test set to obtain a first-stage network model, thereby obtaining a frame-level label corresponding to the second audio data, that is, a second frame-level label through the first-stage network model. The first test set may include a small amount of third audio data that is recorded audio data of an environment, and a frame-level label is artificially labeled. Obviously, the third audio data may multiplex the recorded second audio data, and then artificial frame-level label may be performed on the third audio data. The second audio data and the second frame-level label are input into the second neural network for training the network, so that the second neural network converges relative to a second test set to obtain a second-stage network model. Third audio data contained in the first test set is different from third audio data contained in the second test set.

Then a loss function obtained by the second-stage network model is fed back to the first neural network, and iterative training is repeated until the first neural network and the second neural network converge. Since the second neural network processes the audio data recorded by the environment and the frame-level label corresponding to this audio data, the second neural network may be retrained by adopting a network smaller than the first neural network, so that the computation in the actual process is reduced, and the inference process is accelerated.

In some embodiments of the present disclosure, acquisition methods of an audio data set are divided into two types. The first type is that clean audio is artificially synthesized to noisy audio. And the second type is a real environment scene sound. In some embodiments of the present disclosure, the first acquisition mode includes the following steps. Original clean audio (no background sound and no noise) with several durations (e.g. 200 h, i.e. 200 hours) is selected from an open-source audio data set to obtain a first frame-level label of the original audio, and noise is added on the original audio through the open-source noise data set to obtain first audio data. The second acquisition mode includes the following steps. Audio with a human voice (i.e. with a human speaking sound) and no human voice in an environment for a total of 100 h (50 h respectively) are recorded as second audio data. And the audio acquired by these two acquisition modes is uniformly processed into a monophonic way format with a sampling rate of 16 KHz and 16 bit. It should be understood that in some embodiments of the present disclosure, in order to ensure data balance, a ratio of a total duration of the original audio from the open-source data set to a total duration of the actually recorded second audio data is approximately 1:1. However, in practical application, it may not be limited to 1:1. Similarly, a ratio of a total duration of audio with a human voice to audio without a human voice in the second audio data is not limited to 1:1.

An audio data set is obtained and processed to obtain a corresponding label. Windowed framing is performed on original clean voice data with duration of 100 h obtained from the open-source data set, an energy threshold is defined, and label is performed frame by frame according to the energy threshold. A voice frame is labeled as "1", an unvoiced data frame is labeled as "0", and the labeled data label is stored. In some embodiments of the present disclosure, the first training data used as training data includes: a first frame-level label obtained according to the original clean voice and noisy audio after the original clean voice is noised. However, for the second audio data obtained in the second mode, a frame-level label cannot be obtained, the second audio data is divided into small clips with fixed durations, each clip duration is t seconds, the small clip with a human voice is labeled as "1", the small clip without a human voice is labeled as "0", and the label obtained at this time is a clip-level label (in units of clip audio, not the frame-level label).

Windowed framing is performed on the first audio data and the second audio data. A frame length is T (ms) (note: the frame length is typically divided by 20-50 ms), a spacing is a T/2 (ms) (note: an inter-frame spacing is typically ¼ to ¾ of the frame length), M-order MEL spectrum coefficients of each frame video are extracted as features of a current frame. Then, the M-order MEL spectrum coefficients of the features of N frames are input into the DNN model for joint training. For the first audio data, feature values of N frames are selected as the input, a frame-level label of a current frame is predicted, label "1" represents a voice frame and is expressed by a vector [0, 1], label "0" represents an unvoiced data frame and is expressed by a vector [1, 0], and the input to a network layer of the DNN model is a feature vector of dimension [1, N, M]. For the second audio data, a clip audio duration is t seconds, a frame length is T (ms), a spacing is T/2 (ms), N frames are included, and the corresponding input to the second network is M-dimensional MEL spectra of N frames (number of frames=(duration-frame length)/spacing+1). Label "1" is expressed by vector [0, 1], label "0" is expressed by vector [1, 0], the input to the network layer of the DNN model is a feature vector of dimension [1, N, M], and the output is a label of dimension [1, 2].

Figure 3:
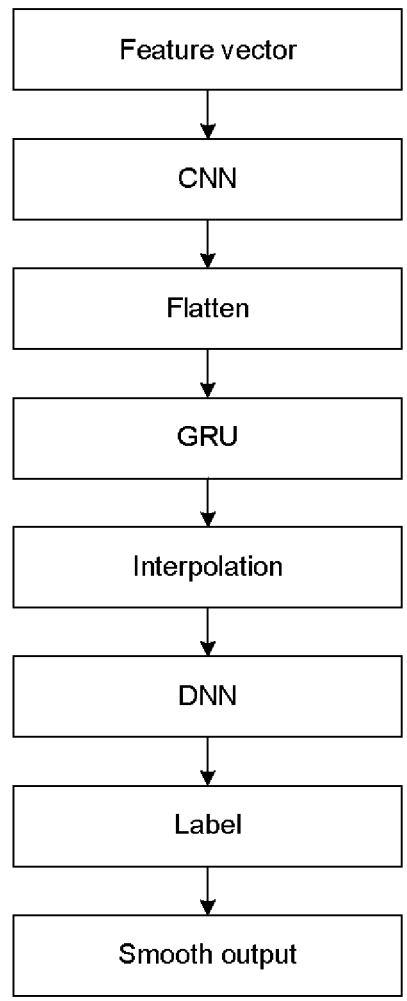
FIG. 3 is a schematic diagram of a network basic structure of a DNN model in a method according to an embodiment of the present disclosure.

In some embodiments of the present disclosure, a network basic structure of the DNN model is composed of CNN+GRU+DNN as shown in FIG. 3. The parameter setting of the network structure may be selected according to an actual task, and the input and output given herein are used for describing the process.

The CNN is mainly used for feature extraction. The CNN includes cnn_block (convolutional block) and pool2d, cnn_block is composed of a Batch Normalization (BN) layer, and a convolutional layer and an activation layer. The number of stacks of cnn_block and pool2d in the CNN and the settings of some parameters such as a step size and the number and size of convolutional kernels may be selected according to the actual situation. In this example, for inputs of dimension [1, N, M], it is assumed that the output of [128, N/4, M/4] is obtained via the CNN. Flatten is used for transforming the output of the CNN as the input to the GRU, and for the CNN output of [128, N/4, M/4], the features of [1, N/4, 128*M/4] are obtained by the flatten transformation. The GRU mainly utilizes the features for prediction. A prediction result is obtained from [1, N/4, 128*M/4] obtained by the flatten transformation through the GRU. It is assumed that the output dimension through the GRU is still [1, N/4, 128*M/4] in this example. Interpolation is mainly used for restoring a time dimension to an input dimension for frame alignment. For example, the GRU output [1, N/4, 128*M/4] is interpolated to [1, N, 128*M/4]. The DNN is mainly used for final sort output. The DNN is also divided into two types according to different input data and corresponding labels. The first type of DNN (frame) finally obtains the output of [1, T, 2] from the interpolated features [1, N, 128*M/4] through a fully connected network and is connected with softmax to obtain a final output label. The number of fully connected layers and the parameter settings still need to be selected according to the actual situation, and it is necessary to ensure that the output dimension of the last layer is 2 (corresponding to a two-dimensional label). The second type of DNN (clip-level) finally obtains the output of [1, N, 2] from the interpolated features [1, N, 128*M/4] through the fully connected network. For each small clip, there is one label, and for the output of [1, N, 128*M/4], time (N) dimension averaging is performed and then the softmax operation is performed to obtain an output label [1, 1, 2].

On the one hand, the training effect is improved by fully utilizing the recorded data in the environment, and on the other hand, the final prediction process can be accelerated. In some embodiments of the present disclosure, the network training is divided into two stages.

In the first stage, data and labels obtained by two modes are used as training data. Namely, first audio data and a first frame-level label corresponding to the first audio data are used as first training data, second audio data and a clip-level label corresponding to the second audio data are used as second training data. Multiple layers of cnn_block are stacked on a neural network structure to ensure that the neural network can fully learn the features of the data, a loss function (i.e. loss function) adopts a weighted cross entropy function, and the cross entropy function is a two-classification cross entropy function. A weighting coefficient is [w1, w2], w1 represents the weight of loss calculated by the first training data (i.e. weight occupied by the classification data obtained according to the first audio data), w2 represents the weight of loss calculated by the second training data (weight occupied by classification data obtained according to the second audio data), the values of w1 and w2 are adjusted according to an actual training result, and it is always kept that w1+w2=1. When the data acquired in the first mode is used for training, a fitting effect of the model on an environment is poor, and when the data acquired in the second mode is used for training, it is difficult to obtain more accurate frame-level labels during testing, namely, i.e. it is difficult to correctly predict a start point and an end point of a human speaking sound.

In the second stage, the second audio data is input into the neural network model of the first stage to generate a second frame-level label, and the second audio data and the second frame-level label corresponding to the second audio data are input as a training set of the second stage. In some embodiments of the present disclosure, the network structure of the second stage is basically unchanged, but the number of cnn_block stacks in the CNN may be appropriately reduced. In addition, since the training data of the second stage includes frame-level labels, a linear function and a softmax function are adopted in the DNN layer, and the corresponding loss function adopts two-classification cross entropy.

Since the performance of the model in the final scene is more concerned in the embodiments of the present disclosure, the audio recorded in the actual scene is used as a verification test set. In order to ensure the training effect, audio in a few environments may be selected to perform artificial frame-level label as a verification test set, and the verification test sets in the first stage and the second stage are different.

In the third stage, when the training of the neural network in the second stage is completed (a test set converges), the loss function is fed back to the neural network in the first stage for continuous training, and after the continuous training of the neural network in the first stage is completed, the neural network in the second stage is continuously iteratively trained, so that the iteration is carried out until the training in the first stage and the second stage is completed (the test sets in the two stages converge).

For each frame in the environment audio, an output result of the second-stage neural network is [a, b], a represents the probability that the label is 0 (i.e. no human voice), b represents the probability that the label is 1 (i.e. human voice), the probability value of b is taken as an output result of each frame, and for frame output results. In some embodiments of the present disclosure, smoothing in a variety of smoothing ways may be performed to obtain a final output label.

Figure 4:
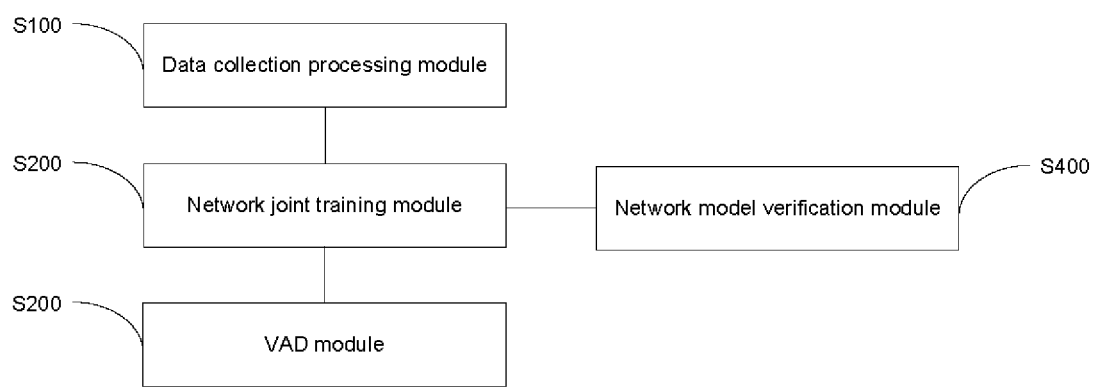
FIG. 4 is a schematic block diagram of a system according to an embodiment of the present disclosure.

As shown in FIG. 4, the system according to the embodiment of the present disclosure includes: a data collection processing module 100, configured to acquire original audio data and a first frame-level label configured based on an open-source audio data set, add noise on the original audio data to obtain first audio data, record an environment sound to obtain second audio data, and perform clip-level label on the second audio data to obtain a clip-level label; a network joint training module 200, configured to input the first audio data and the first frame-level label as first training data and the second audio data and the clip-level label as second training data into a first neural network for training to obtain a first-stage network model, obtain a second frame-level label corresponding to the second audio data through the first-stage network model, and input the second audio data and the second frame-level label into a second neural network for training to obtain a second-stage network model; and a VAD module 300, configured to perform VAD on an audio signal based on the first-stage network model and the second-stage network model. A network model verification module 400 is configured to select multiple second audio data, perform frame-level label on the multiple second audio data to obtain a third audio data set, and split the third audio data set into two groups of data sets, one group of data sets being used for verifying and testing the first-stage network model, and the other group of data sets being used for verifying and testing the second-stage network model.

Although specific implementation schemes have been described herein, those of ordinary skill in the art will recognize that many other modifications or alternative implementation schemes are equally within the scope of the present disclosure. For example, any of the functions and/or processing capabilities described in connection with a particular device or component may be performed by any other device or component. In addition, while various exemplary specific implementations and architectures have been described according to the implementation schemes of the present disclosure, those of ordinary skill in the art will recognize that many other modifications to the exemplary specific implementations and architectures described herein are within the scope of the present disclosure.

Certain aspects of the present disclosure are described above with reference to block diagrams and flowcharts of systems, methods, systems, and/or computer program products according to the exemplary implementations. It will be understood that one or more blocks of the block diagrams and flowcharts, and combinations of blocks in the block diagrams and flowcharts may be implemented by executing computer-executable program instructions, respectively. Also, some of the blocks in the block diagrams and flowcharts may not necessarily be executed in the order shown, or may not all be executed, according to some implementation schemes. In addition, additional components and/or operations beyond those shown in the blocks of the block diagrams and flowcharts may exist in some implementation schemes.

Therefore, the blocks of the block diagrams and flowcharts support combinations of apparatuses for performing specified functions, combinations of elements or steps for performing specified functions, and program instruction apparatuses for performing specified functions. It will also be understood that each block of the block diagrams and flowcharts and combinations of the blocks of the block diagrams and flowcharts may be implemented by special-purpose hardware computer systems which perform specified functions, elements or steps, or combinations of special-purpose hardware and computer instructions.

Program modules, applications, etc. described herein may include one or more software components, including, for example, software objects, methods, data structures, etc. Each of such software components may include computer-executable instructions that, in response to execution, cause at least a portion of the functions described herein (e.g., one or more operations of the exemplary methods described herein) to be performed.

The software components may be encoded in any of a variety of programming languages. One exemplary programming language may be a low-level programming language, such as an assembly language associated with a particular hardware architecture and/or operating system platform. Software components including assembly language instructions may need to be converted to executable machine code by an assembler prior to execution by a hardware architecture and/or platform. Another exemplary programming language may be a higher-level programming language that may be migrated across multiple architectures. Software components, including higher-level programming languages, may need to be converted to intermediate representations by an interpreter or a compiler prior to execution. Other examples of programming languages include, but are not limited to, a macro language, a shell or command language, a job control language, a scripting language, a database query or search language, or a report writing language. In at least one exemplary implementation scheme, a software component including instructions of one of the programming language examples described above may be executed directly by an operating system or other software components without first converting to another form.

The software components may be stored as files or other data storage constructs. The software components having similar types or related functions may be stored together, for example, in a particular directory, folder or library. The software components may be static (e.g., preset or fixed) or dynamic (e.g., created or modified upon execution).

The embodiments of the present disclosure have been described in detail with reference to the accompanying drawings, but the present disclosure is not limited to the above embodiments, and various changes can be made without departing from the spirit of the present disclosure within the knowledge range of those of ordinary skill in the art.

What is claimed is:

1. A Voice Activity Detection (VAD) method based on a joint Deep Neural Network (DNN), comprising:
    acquiring original audio data and a first frame-level label based on an open-source audio data set, adding noise on the original audio data to obtain first audio data, recording an environment sound to obtain second audio data, and performing clip-level label on the second audio data to obtain a clip-level label;
    inputting the first audio data and the first frame-level label as first training data and the second audio data and the clip-level label as second training data into a first neural network for training to obtain a first-stage network model;
    obtaining a second frame-level label corresponding to the second audio data through the first-stage network model, and inputting the second audio data and the second frame-level label into a second neural network for training to obtain a second-stage network model; and
    performing VAD on an audio signal based on the first-stage network model and the second-stage network model.

2. The VAD method based on the joint DNN as claimed in claim 1, wherein acquiring the original audio data and the first frame-level label based on the open-source audio data set, adding noise on the original audio data to obtain the first audio data, recording the environment sound to obtain the second audio data, and performing the clip-level label on the second audio data to obtain the clip-level label comprises:
    acquiring the original audio data based on the open-source audio data set, performing windowed framing on the original audio data, label frame by frame according to a preset energy threshold to obtain the first frame-level label, and adding noise on the original audio data in proportion to obtain the first audio data; and
    clipping the second audio data according to a fixed duration, determining whether human voice information exists in each clip to obtain a determination result, and acquiring the clip-level label according to the determination result.

3. The VAD method based on the joint DNN as claimed in claim 2, wherein the preset energy threshold is used for determining whether a voice frame or an unvoiced data frame is valid for original clean voice.

4. The VAD method based on the joint DNN as claimed in claim 2, wherein a clip where the human voice information exists is labeled as 1, and a clip where the human voice information does not exist is labeled as 0.

5. The VAD method based on the joint DNN as claimed in claim 2, wherein an inter-frame spacing of the windowed framing is associated with a frame length of the windowed framing.

6. The VAD method based on the joint DNN as claimed in claim 2, wherein inputting the first audio data and the first frame-level label as the first training data and the second audio data and the clip-level label as the second training data into the first neural network for training to obtain the first-stage network model comprises:

performing windowed framing on the first audio data and the second audio data according to a preset frame length and a preset frame spacing, extracting M-order MEL spectrum coefficients of each frame as features of a current frame, selecting feature values of N frames, and inputting the M-order MEL spectrum coefficients of the feature values of N frames to the first-stage network model; and determining that the first-stage network model to comprise a Convolutional Neural Network (CNN) for extracting features, a Gate Recurrent Unit (GRU) for feature prediction and a DNN for final classification output, wherein the DNN is used for respectively classifying the first audio data and the second audio data to obtain classification data corresponding to the first audio data and classification data corresponding to the second audio data, and a loss function in the first-stage network model is a weighted two-classification cross entropy function with weighting coefficients [w1, w2], w1 represents a weight occupied by the classification data obtained according to the first audio data, and w2 represents a weight occupied by the classification data obtained according to the second audio data.

7. The VAD method based on the joint DNN as claimed in claim 6, wherein the first audio data is classified using a DNN of a frame to obtain a classification label corresponding to the first audio data.

8. The VAD method based on the joint DNN as claimed in claim 6, wherein the second audio data is classified using a DNN of a clip level to obtain a classification label corresponding to the second audio data.

9. The VAD method based on the joint DNN as claimed in claim 6, wherein the sum of w1 and w2 is 1.

10. The VAD method based on the joint DNN as claimed in claim 1, further comprising:

when the second-stage network model converges relative to a second test set, feeding a loss function of the second-stage network model back to the first-stage network model for continuous training; and when the first-stage network model converges to a first test set after continuous training, continuing to iteratively train the second-stage network model until the first-stage network model converges relative to the first test set and the second stage network model converges relative to the second test set.

11. The VAD method based on the joint DNN as claimed in claim 10, wherein third audio data contained in the first test set is different from third audio data contained in the second test set.

12. The VAD method based on the joint DNN as claimed in claim 1, further comprising:

selecting a plurality of second audio data, and performing frame-level label on the plurality of second audio data to obtain a third audio data set; and splitting the third audio data set into two groups of data sets, one group of data sets being used for verifying and testing the first-stage network model, and the other group of data sets being used for verifying and testing the second-stage network model.

13. The VAD method based on the joint DNN as claimed in claim 1, wherein the number of convolutional block stacks in a CNN of the second-stage network model is less than the number of convolutional block stacks in a CNN of the first-stage network model.

14. The VAD method based on a joint DNN as claimed in claim 1, wherein the second-stage network model comprises a CNN for feature extraction, a GRU for feature prediction, and a DNN for final classification output, a linear function and a softmax function being adopted in a DNN layer, and a loss function being a two-classification cross entropy function.

15. A Voice Activity Detection (VAD) system based on a joint Deep Neural Network (DNN), comprising:

a data collection processing module, configured to acquire original audio data and a first frame-level label configured based on an open-source audio data set, add noise on the original audio data to obtain first audio data, record an environment sound to obtain second audio data, and perform clip-level label on the second audio data to obtain a clip-level label;

a network joint training module, configured to input the first audio data and the first frame-level label as first training data and the second audio data and the clip-level label as second training data into a first neural network for training to obtain a first-stage network model, obtain a second frame-level label corresponding to the second audio data through the first-stage network model, and input the second audio data and the second frame-level label into a second neural network for training to obtain a second-stage network model; and a VAD module, configured to perform VAD on an audio signal based on the first-stage network model and the second-stage network model.

16. The VAD system based on the joint DNN as claimed in claim 15, further comprising:

a network model verification module, configured to select a plurality of second audio data, perform frame-level label on the plurality of second audio data to obtain a third audio data set, and split the third audio data set into two groups of data sets, one group of data sets being used for verifying and testing the first-stage network model, and the other group of data sets being used for verifying and testing the second-stage network model.

17. A computer non-transitory storage medium storing a computer program, which is executed by a processor to implement a Voice Activity Detection (VAD) method based on a joint Deep Neural Network (DNN), the VAD method based on the joint DNN comprising:

acquiring original audio data and a first frame-level label based on an open-source audio data set, adding noise on the original audio data to obtain first audio data, recording an environment sound to obtain second audio data, and performing clip-level label on the second audio data to obtain a clip-level label;

inputting the first audio data and the first frame-level label as first training data and the second audio data and the clip-level label as second training data into a first neural network for training to obtain a first-stage network model;

obtaining a second frame-level label corresponding to the second audio data through the first-stage network model, and inputting the second audio data and the second frame-level label into a second neural network for training to obtain a second-stage network model; and performing VAD on an audio signal based on the first-stage network model and the second-stage network model.

* * * * *